United States Patent
Brown et al.

(10) Patent No.: US 8,521,130 B2
(45) Date of Patent: *Aug. 27, 2013

(54) SYSTEM AND METHOD OF SECURE MESSAGE PROCESSING

(75) Inventors: Michael S. Brown, Waterloo (CA); Neil P. Adams, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1606 days.

This patent is subject to a terminal disclaimer.

(21) Appl. No.: 11/511,168

(22) Filed: Aug. 28, 2006

(65) Prior Publication Data

US 2006/0293035 A1 Dec. 28, 2006

Related U.S. Application Data

(63) Continuation of application No. 10/832,583, filed on Apr. 26, 2004, now Pat. No. 7,123,900.

(60) Provisional application No. 60/494,621, filed on Aug. 12, 2003.

(51) Int. Cl.
*H04M 1/66* (2006.01)

(52) U.S. Cl.
USPC ........ 455/410; 455/411; 455/414; 455/414.2; 455/466

(58) Field of Classification Search
USPC ................. 455/410, 411, 414.1, 414.2, 466, 455/566, 403, 567, 414.4
See application file for complete search history.

(56) References Cited

U.S. PATENT DOCUMENTS

| | | | | |
|---|---|---|---|---|
| 4,486,856 A | * | 12/1984 | Heckel et al. | 345/557 |
| 6,061,731 A | * | 5/2000 | Blakeslee | 709/231 |
| 6,301,484 B1 | | 10/2001 | Rogers et al. | |
| 6,393,297 B1 | * | 5/2002 | Song | 455/466 |
| 6,591,095 B1 | | 7/2003 | Palaniswamy et al. | |
| 6,600,814 B1 | * | 7/2003 | Carter et al. | 379/88.16 |
| 7,164,928 B2 | * | 1/2007 | Ding et al. | 455/466 |
| 7,281,201 B2 | * | 10/2007 | Kumar et al. | 715/255 |
| 7,415,607 B2 | | 8/2008 | Sinn | |
| 2002/0142808 A1 | | 10/2002 | Abbasi | |
| 2002/0166049 A1 | | 11/2002 | Sinn | |
| 2003/0009595 A1 | * | 1/2003 | Collins | 709/247 |
| 2003/0033480 A1 | * | 2/2003 | Jeremiassen | 711/118 |

(Continued)

FOREIGN PATENT DOCUMENTS

| | | |
|---|---|---|
| EP | 1195971 | 4/2002 |
| EP | 1580953 | 9/2005 |

(Continued)

OTHER PUBLICATIONS

International Search Report of Application No. PCT/CA2004/000616, date of mailing Sep. 6, 2004—14pgs.

(Continued)

*Primary Examiner* — Patrick Edouard
*Assistant Examiner* — Julio Perez
(74) *Attorney, Agent, or Firm* — Alexander Anishchenko; Borden Ladner Gervais LLP

(57) ABSTRACT

A system and method for handling message indicator processing on a wireless mobile communications device. Message state data is stored in a cache for use in generating message indicators.

30 Claims, 8 Drawing Sheets

(56) References Cited

U.S. PATENT DOCUMENTS

| | | |
|---|---|---|
| 2003/0187938 A1* | 10/2003 | Mousseau et al. ............ 709/206 |
| 2004/0180646 A1 | 9/2004 | Donley et al. |
| 2004/0203589 A1 | 10/2004 | Wang et al. |
| 2004/0203941 A1 | 10/2004 | Kaplan et al. |
| 2004/0224675 A1 | 11/2004 | Puskoor et al. |
| 2005/0054334 A1 | 3/2005 | Brown et al. |
| 2005/0111631 A1 | 5/2005 | Jordan, Jr. |
| 2006/0084450 A1* | 4/2006 | Dam Nielsen et al. ....... 455/466 |

FOREIGN PATENT DOCUMENTS

| | | | |
|---|---|---|---|
| WO | WO 01/19049 | A2 | 3/2001 |
| WO | WO 01/35685 | A1 | 5/2001 |
| WO | 02/01373 | A1 | 1/2002 |
| WO | WO 02/01373 | A1 | 1/2002 |
| WO | 03/036887 | A1 | 5/2003 |
| WO | WO 03/036887 | A1 | 5/2003 |
| WO | 03/075530 | A1 | 9/2003 |
| WO | 2005/015861 | A1 | 2/2005 |
| WO | 2005/107177 | A1 | 11/2005 |
| WO | 01/19049 | A2 | 3/2006 |

OTHER PUBLICATIONS

European Extended Search Report issued on Oct. 15, 2008 in connection with European Application No. 08152167.6.
Partial European Search Report issued on Jul. 29, 2008 in connection with European Application No. 08152167.6.
Partial European Search Report, with Annex, Aug. 18, 2004 (2 pages).
European Search Report issued on Feb. 28, 2008 in connection with European Application No. 07114623.7.

* cited by examiner

SYSTEM AND METHOD OF SECURE MESSAGE PROCESSING

CROSS-REFERENCE TO RELATED APPLICATION

This application claims priority to and is a continuation of U.S. patent application Ser. No. 10/832,583 entitled "System and Method of Secure Message Processing," filed on Apr. 26, 2004 now U.S. Pat. No. 7,123,900, which claims priority to and the benefit of U.S. provisional application Ser. No. 60/494,621 (entitled "System and Method of Efficient Secure Email Icon Processing"filed Aug. 12, 2003). By this reference, the full disclosure, including the drawings, of U.S. patent application Ser. No. 10/832,583 and U.S. provisional application Ser. No. 60/494,621, are incorporated herein by reference.

BACKGROUND

1. Technical Field

This invention relates generally to the field of secure electronic messaging, and in particular to icon or other indicator processing on a messaging client on a mobile communication device.

2. Description of the Related Art

Known secure messaging software clients, such as electronic mail (e-mail) software applications operating on desktop computer systems, represent the status of a secure message using a series of visual message indicators. These indicators include icon images, text strings, and/or a combination of both images and text.

When a secure e-mail message is displayed to the user, the state of the message is indicated to the user as a set of message indicators. For example, if the content of a message is covered by a digital signature, an indicator representing that the message is signed could appear at the top of the message body. As another example, if the content of the message is protected by an encryption mechanism, an indicator indicating that the message is encrypted could appear at the top of the message body.

Other examples of indicators used to convey information about the state of the message include but are not limited to: indicators representing the trust status or revocation status of the digital certificate whose corresponding private key is used to sign a digitally signed message; indicators representing the state of any digital certificates that are attached to the message; and indicators representing whether the sender of the message asked that a signed receipt be sent when the message is read by the recipient.

In one implementation of secure email processing, determining and displaying the image, text, and any other information applicable to indicator, requires considerable processing time. Many of the secure email encoding methods in current use are complicated. Furthermore, extraction of the required information from a particular encoded message in order to determine and to construct an applicable indicator can be time-consuming.

SUMMARY

In accordance with the teachings disclosed herein, systems and methods are provided for handling message indicator processing on a wireless mobile communications device. Message state data is stored in a cache for use in generating visual message indicators.

As an example, a method may include handling an encoded message that was received by a wireless mobile communications device, wherein state data about the encoded message is generated based upon a first access of the encoded message. The message state data is stored in a cache of the mobile device and accessed based upon a second access (e.g., an opening, displaying, etc.) of the encoded message. A message indicator is generated based upon the message state data that was accessed from the cache and is provided to the user.

As another example, a system may include handling an encoded message that was received by a wireless mobile communications device. A message processor on the mobile device stores the message state data in a cache. An accessing module that, based upon a second opening of the encoded message, retrieves from the cache the stored message state data. A message indicator is generated based upon the message state data that is accessed from the cache. The generated message indicator is provided to a user of the mobile device.

BRIEF DESCRIPTION OF THE DRAWINGS

Same reference numerals are used in different figures to denote similar elements.

DETAILED DESCRIPTION OF THE DRAWINGS

Figure 1:
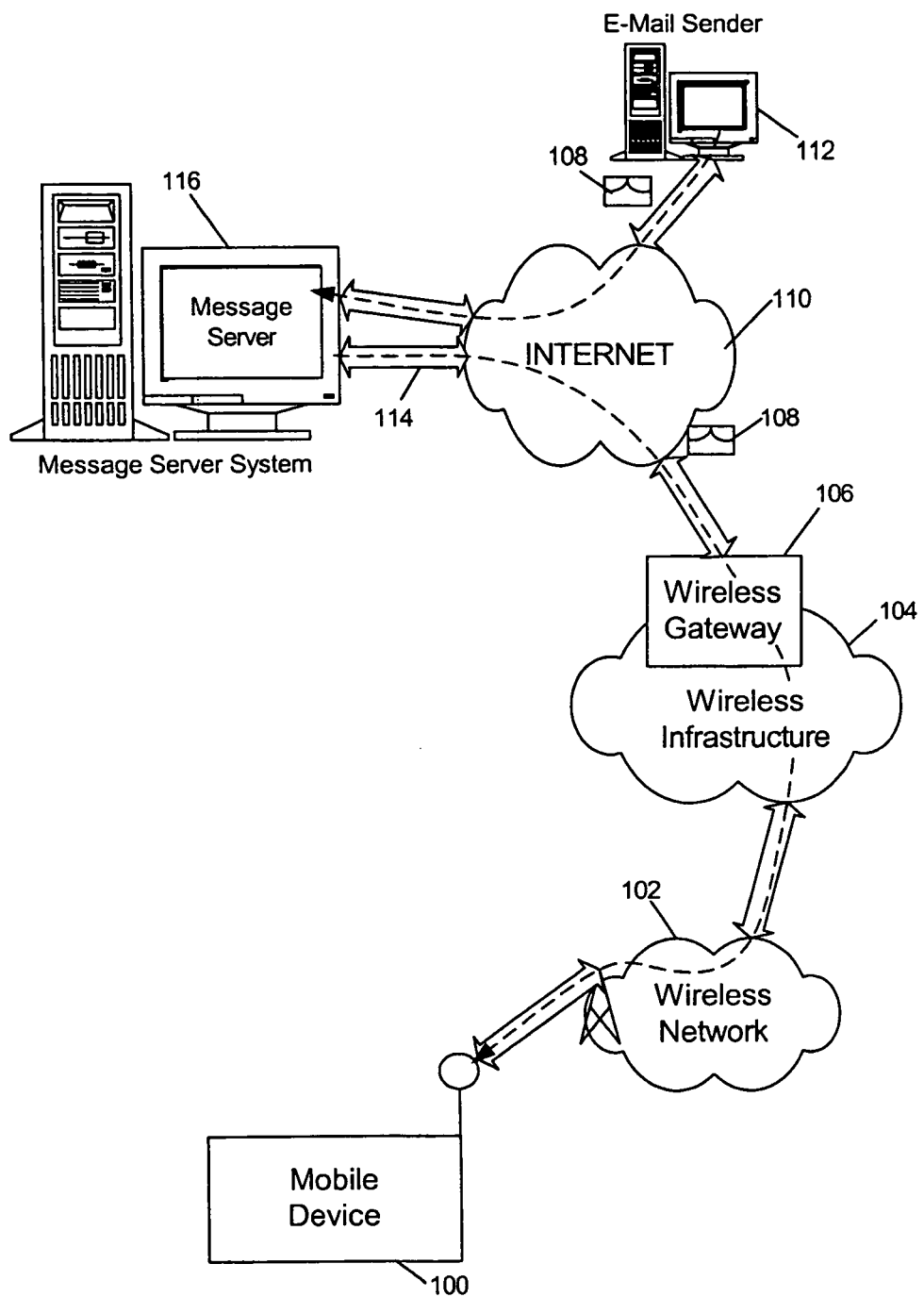
FIG. 1 is an overview of an example communication system in which a mobile device may be used.

Approaches disclosed herein for providing message indicators on mobile devices may be used with many different types of communication systems. As an example, FIG. 1 is an overview of an example communication system in which a mobile device may be used with the approaches disclosed herein. One skilled in the art will appreciate that there may be hundreds of different topologies, but the system shown in FIG. 1 helps demonstrate the operation of the encoded message processing systems and methods described herein. There may also be many message senders and recipients. The system shown in FIG. 1 is for illustrative purposes only.

FIG. 1 shows an e-mail sender 112, the Internet 110, a message server system 116, a wireless gateway 106, wireless infrastructure 104 a wireless network 102 and a mobile device 100. An e-mail sender system 112 may, for example, be connected to an ISP (Internet Service Provider) on which a user of the system 112 has an account, located within a company, possibly connected to a local area network (LAN), and connected to the Internet 110, or connected to the Internet 110 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 116 may be implemented on a network computer within the firewall of a corporation, a computer within an ISP or ASP system or the like, and acts as the main interface for e-mail exchange over the Internet 110. Although other messaging systems might not require a message server system 116, a mobile device 100 configured for receiving and possibly sending e-mail will typically be associated with an account on a message server. Two common message servers are Microsoft Exchange™ and Lotus Domino™. These products are often used in conjunction with Internet mail routers that route and deliver mail. These intermediate components are not shown in FIG. 1, as they do not directly play a role in the encoded message processing described below. Message servers such as server 116 typically extend beyond just e-mail sending and receiving; they also include dynamic database storage engines that have predefined database formats for data like calendars, to-do lists, task lists, e-mail and documentation.

The wireless gateway 106 and infrastructure 104 provide a link between the Internet 110 and wireless network 102. The wireless infrastructure 104 may determine the most likely network for locating a given user and track users as they roam between countries or networks. A message is then delivered to the mobile device 100 via wireless transmission, typically at a radio frequency (RF), from a base station in the wireless network 102 to the mobile device 100. The particular network 102 may be virtually any wireless network over which messages may be exchanged with a mobile device.

As shown in FIG. 1, a composed e-mail message 108 is sent by the e-mail sender 10, located somewhere on the Internet 110. This message 108 may be fully in the clear and may use traditional Simple Mail Transfer Protocol (SMTP), RFC822 headers and Multipurpose Internet Mail Extension (MIME) body parts to define the format of the mail message. These techniques are all well known to those skilled in the art. The message 108 arrives to the message server 116 and is normally stored in a message store. Most known messaging systems support a so-called "pull" message access scheme, wherein a mobile device 100 requests that stored messages be forwarded by the message server 116 to the mobile device 100. Some systems provide for automatic routing of such messages are addressed using a specific e-mail address associated with the mobile device 100. Messages may be addressed to a message server account associated with a host system such as a home computer or office computer, which belongs to the user of a mobile device 100 and redirected from the message server 116 to the mobile device 100 as they are received.

Regardless of the specific mechanism controlling the forwarding of messages to a mobile device 100, the message 108, or possibly a translated or reformatted version thereof, is sent to the wireless gateway 106. The wireless infrastructure 104 includes a series of connections to wireless network 102.

Figure 2:
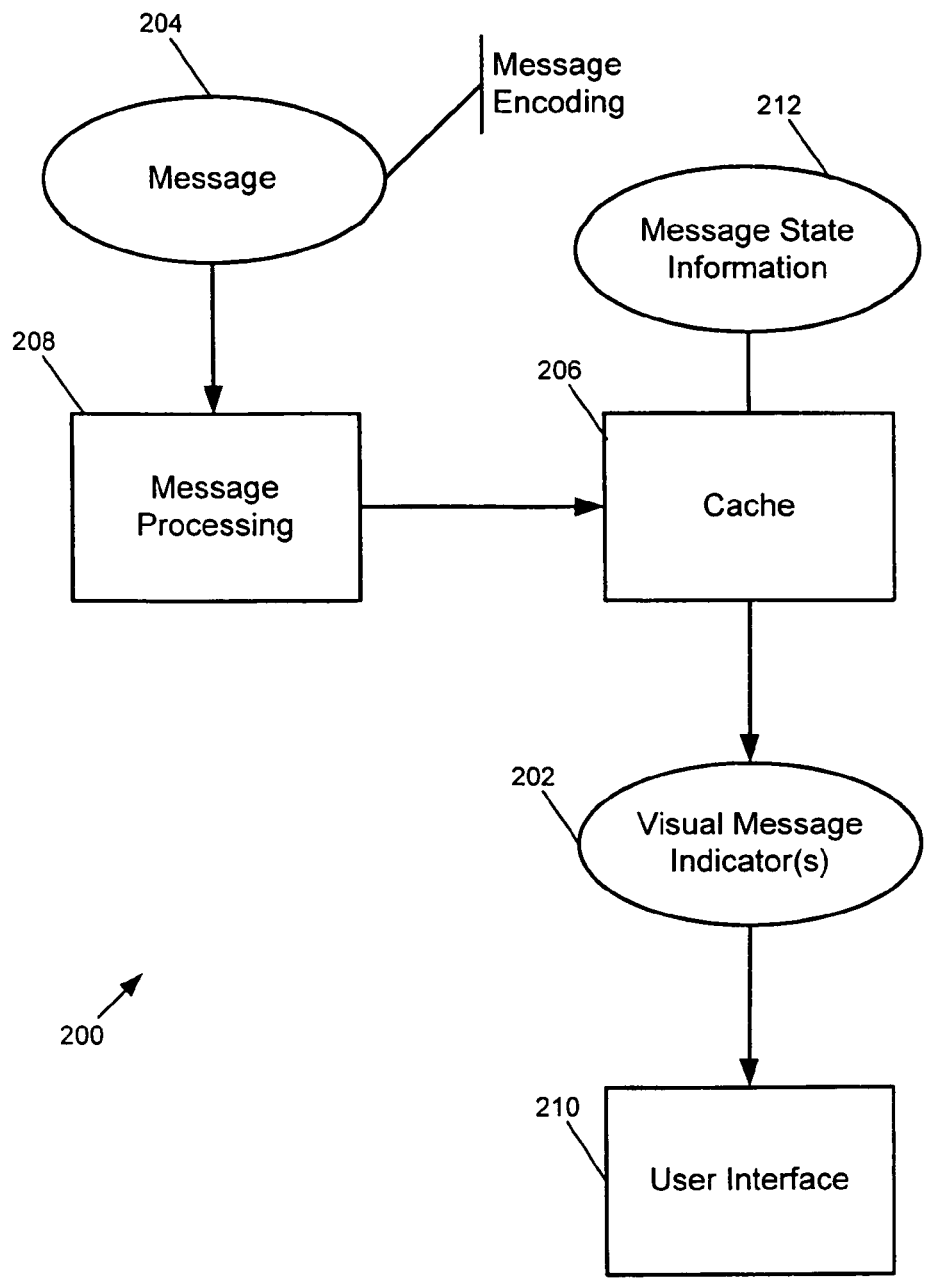
FIG. 2 is a block diagram depicting components used in processing message indicators.

FIG. 2 shows at 200 components used in processing message indicators 202 on a mobile device. When a particular message 204 is opened in this example for the first time, the mobile device's cache 206 contains no information related to the message 204. The message encoding is decoded and processed at module 208 in order to determine the information 212 that is to be displayed on the user interface 210 via the message indicator(s) 202. The information 212 determined by module 208 is then saved in the message state cache 206. Examples of such information 212 include but are not limited to: the validity of the digital signature covering a signed message; the name and/or email address of the sender of the message; and the content cipher that was used to encrypt the message.

The next time the message 204 is opened, the message state information 212 is retrieved from the message state cache 206. This state information 212 can be used to determine a number of appropriate message indicators 202 for the message 204, and these message indicators 202 may be displayed substantially immediately, before any message encoding processing takes place, such as decryption of the message. For example, the message 204 may be pre-processed before more intensive processing occurs. The information obtained during message pre-processing (e.g., signature status and/or trust status) can be used to populate the cache and to generate indicator(s) for display before additional message processing is performed. Other information may be available due to message pre-processing depending upon how the message 204 was encoded. For instance, if the message was encrypted and signed, then such information as who encrypted the message, which keys were used to perform the encryption, what cipher algorithm, and the like, may be used to generate indicator(s) before more intensive processing is performed.

Preferably, other information about the message 204, such as the decoded message body, could also be cached so that the entire message can be displayed quickly to the user. However, even without a message body cache, the message state cache 206 can be used to render the message indicators 202 quickly and efficiently.

It should be understood that an access of a message 204 may occur under different situations. For example, the message 204 may be accessed because of a user-initiated action (e.g., opening the message 204) or may be accessed automatically by the mobile device upon receipt of the message 204. The message state data 212 stored in the cache 206 is made available for subsequent accessing of the message 204. This includes the message state data 212 being available between a first and second openings of the message 204, wherein the message 204 was closed by the user between the first and second openings.

Figure 3:
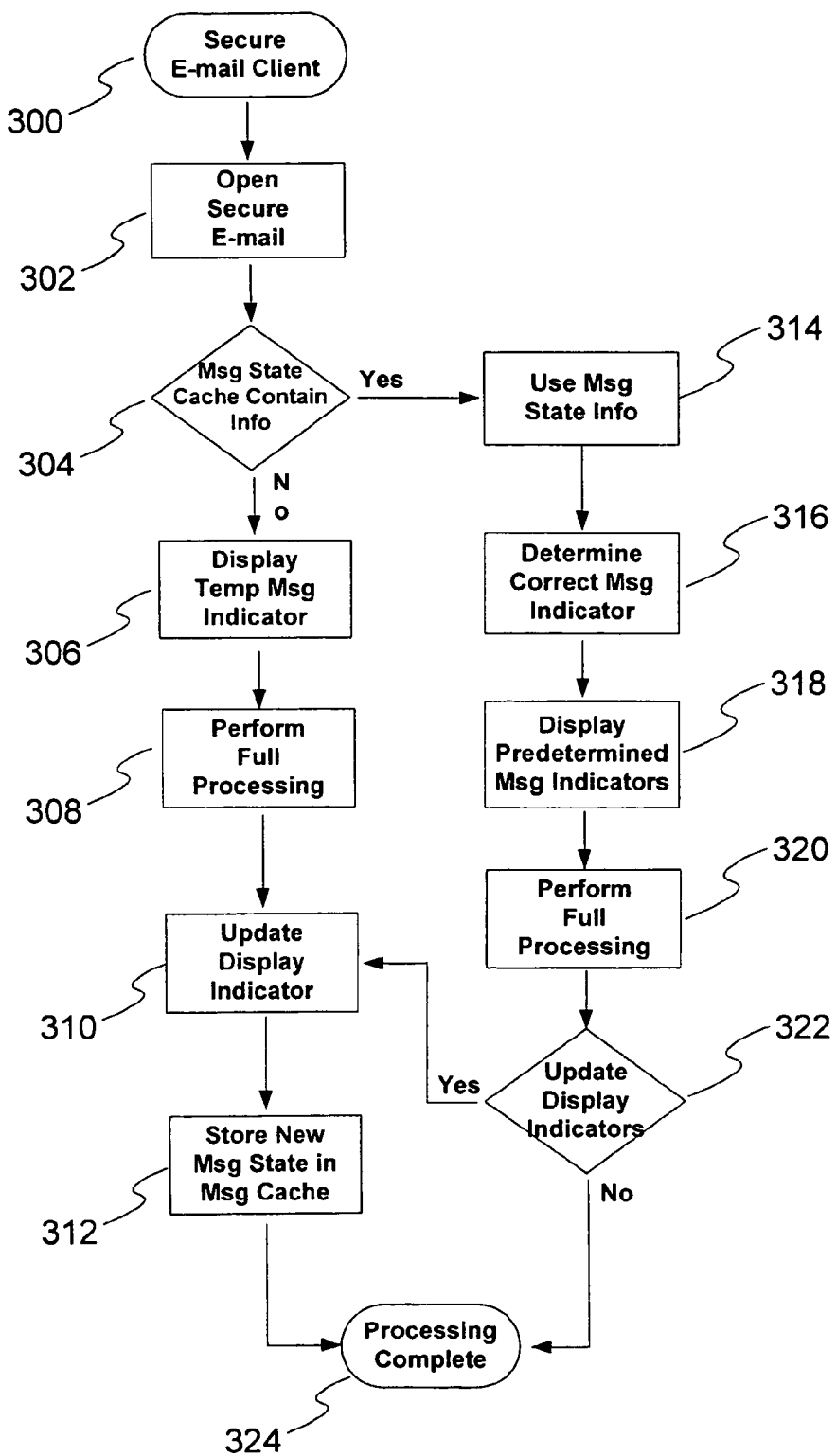
FIG. 3 is a flow diagram illustrating a decision path scenario for processing message indicators.

FIG. 3 is a flow diagram illustrating a decision path to process message indicators. The process starts at the secure e-mail client application 300 with the user opening a secure e-mail message at step 302. The system then determines whether the message state cache contains information pertaining to the message at step 304. If the message state cache contains no information for the message, the system displays a temporary message indicator at step 306. The system then performs full processing on the received message at step 308, and then updates the display indicators at step 310.

With reference back to step 304, if the message state cache contains information for the message, then the system would use the message state information at step 314 and determine the correct message indicator at step 316 based on this information. The system then displays the predetermined message indicator at step 318 and performs full processing on the received message at step 320. The indicator display may be performed such that any visible changes in the state of the indicator be seamless to the user, thereby avoiding any visual confusion as the indicators are updated. For example, to avoid potentially confusing the user, the mobile device's display interface is not repainted, and/or the cursor is not repositioned if it is determined that the message state has not changed. If there is a change, then the user may be alerted accordingly if desired.

The system then determines whether the display indicators require further updating at step 322. If so, the system will update the display indicator at step 310. If the display indicators do not need updating, the indicator will be displayed and the process is complete as shown at 324.

Once the update of the display indicator (via input from steps 308 and/or 310) is completed at step 310, the system will store the new message state information in the message state cache at step 312. At this point, the process is also completed as shown at 324. Other user indicators may be used if needed, such as audio indicators, icon images, text strings, and/or a combination of both images and text, if so desired. Such indicators would be generated based upon the cached message state data.

The indicators can convey many different types of message state information. For example, if the content of a message is covered by a digital signature, an indicator representing that the message is signed could appear at the top of the message body. As another example, if the content of the message is protected by an encryption mechanism, an indicator indicating that the message is encrypted could appear at the top of the message body.

Other examples of indicators used to convey information about the state of the message include but are not limited to: indicators representing the trust status or revocation status of the digital certificate whose corresponding private key is used to sign a digitally signed message; indicators representing the state of any digital certificates that are attached to the message; and indicators representing whether the sender of the message asked that a signed receipt be sent when the message is read by the recipient. The operational scenario of the flow chart illustrates that the user experiences minimum delay before an indicator is displayed due at least in part to being less processor-intensive.

Figure 4:
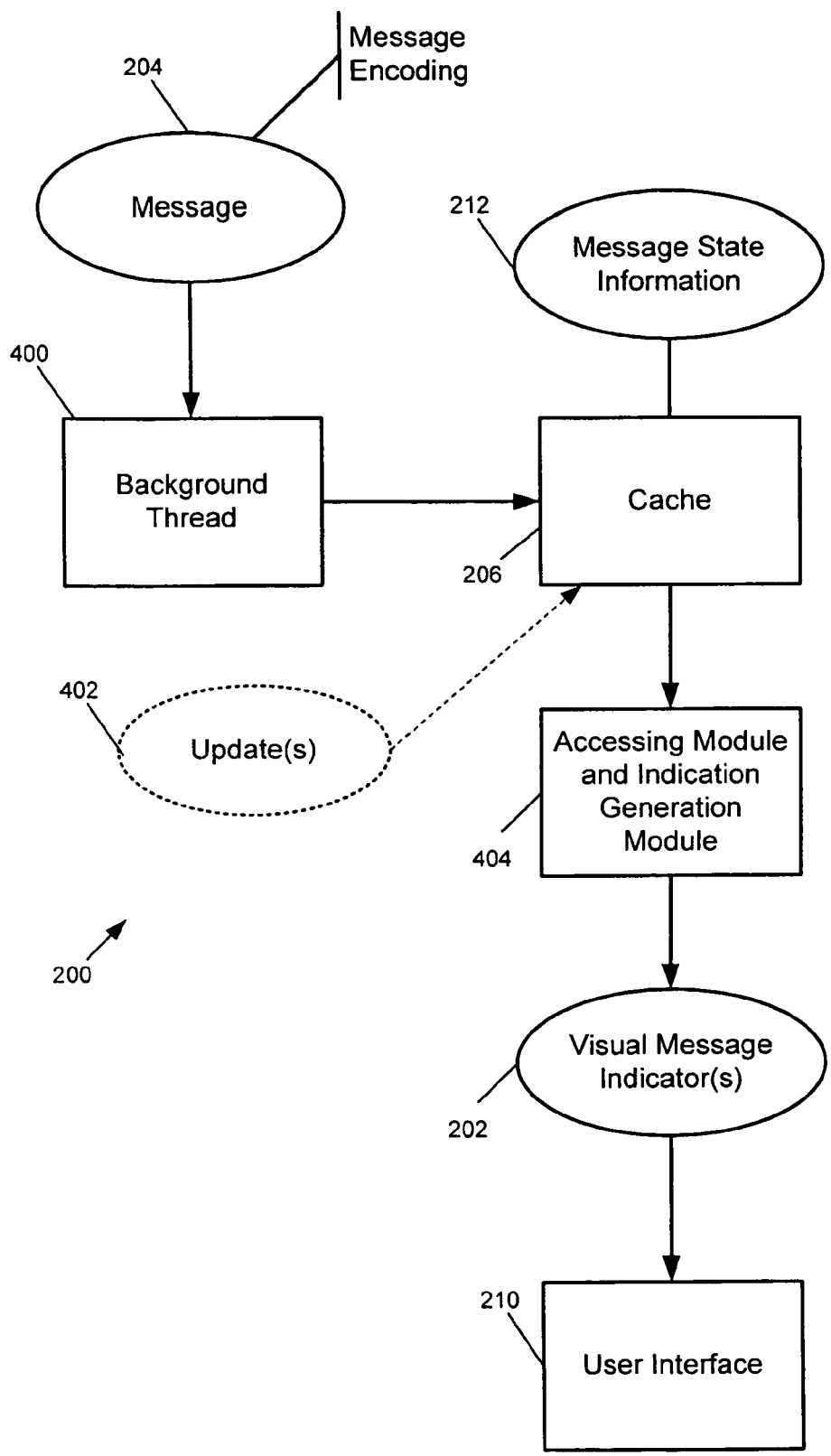
FIG. 4 is a block diagram depicting updates to message state data for use in processing message indicators.

With reference to FIG. 4, after the message indicators 202 have been rendered using the cached message state data 212, an application may continue to process the encoded message 204. The continued processing can be done by a background thread 400 which is invisible/unnoticeable to the user. This is done in case any of the cached message state has been rendered invalid by changes in the operating environment since the message 204 was last opened and the message state data was cached. Some examples of changes in the operating environment that may trigger an indicator change include the revocation of the digital certificate whose corresponding private key is used to sign a changed message, the addition of a related digital certificate to a set of trusted certificates in the system, change in validity of the certificate, or tampering of the message or signature.

If any such indicator changes have occurred, the application would update the message indicators 202 from the background thread 400 to reflect the new values. The updated message state information 402 would then be cached again, overwriting the existing cached data. If any such changes had not occurred, the message indicators 202 would not be updated. Consequently, the user is only made visually aware of any background message processing when the state of the displayed message indicators 202 is incorrect.

The cache 206 can be cleared of any sensitive information about the message 204 when one of a set of events occurs. For example, if the user selects a particular menu item, or if the system goes into a locked mode, or a mode where the device is locked up and no activity can be performed, any sensitive data can be removed from the cache 206.

In the system shown in FIG. 4, software instructions, (e.g., implemented as an accessing and indication generation module 404) allow for the message state information, including any message state updates 402, to be retrieved over multiple message openings from the cache 206 for use in generating indicator(s) 202. Accordingly, the message state data 212 that was stored in the cache 206 due to a first opening of the encoded message 204 is made available for retrieval from the cache 206 for a second opening of the encoded message 204 and other subsequent message accesses and openings.

The above-described systems and methods of the present invention are intended to be examples only. Those of skill in the art may effect alterations, modifications and variations to the particular embodiments without departing from the scope of the invention which is defined by the claims. For example, data signals transmitted using a communication channel may be used with the systems and methods. The data signals can include any type of data or voice information, such as an encoded message provided to a mobile device. The data signal may be packetized data that is transmitted through a carrier wave across the network. Still further computer-readable media may be used that is capable of causing a mobile device to perform the methods disclosed herein.

Figure 5:
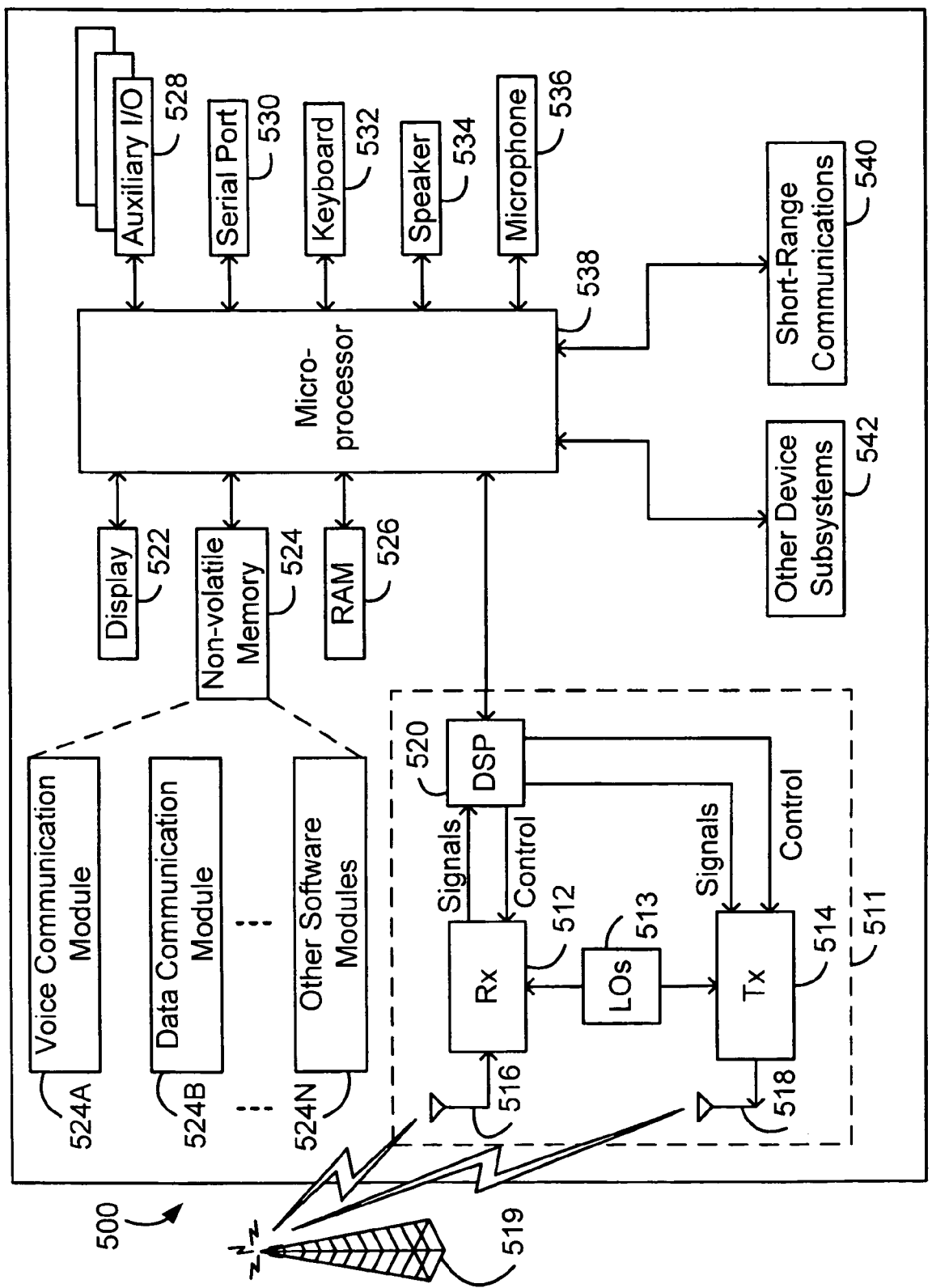
FIG. 5 is a block diagram of a wireless mobile communication device as an example of an electronic device.

As another example, the systems and methods disclosed herein may be used with many different types of electronic devices. FIG. 5 is a block diagram of a wireless mobile communication device as an example of such an electronic device. The mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 5 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 5, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, RAM 526, auxiliary I/O devices 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536.

Some of the subsystems shown in FIG. 5 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 may also include data stores for owner information and owner control information. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to insert owner information and owner control information onto the mobile device 500 and to download other application modules 524N for installation on the mobile device 500. This wired download path may further be used to load an encryption key onto the mobile device 500 for use in secure communications, which is a more secure method than exchanging encryption information via the wireless network 519.

Owner information, owner control information and additional application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which preferably further processes the received signal for output to the display 522, or, alternatively, to an auxiliary I/O device 528. Owner information, owner control information, commands or requests related to owner information or owner control information, and software applications received by the transceiver 511 are processed as described above. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511.

When the mobile device 500 is operating in a voice communication mode, the overall operation of the mobile device 500 is substantially similar to the data mode, except that received signals are output to the speaker 534 and voice signals for transmission are generated by a microphone 536. In addition, the secure messaging techniques described above might not necessarily be applied to voice communications. Alternative voice or audio I/O devices, such as a voice message recording subsystem, may also be implemented on the mobile device 500. Although voice or audio signal output is accomplished through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also be included in the mobile device 500. For example, the subsystem 540 may include an infrared device and associated circuits and components, or a Bluetooth or 802.11 short-range wireless communication module to provide for communication with similarly-enabled systems and devices. Thus, owner information insertion, owner control information insertion, and application loading operations as described above may be enabled on the mobile device 500 via the serial port 530 or other short-range communications subsystem 540.

FIG. 5 represents a specific example of an electronic device in which owner control systems and methods described above may be implemented. Implementation of such systems and methods in other electronic devices having further, fewer, or different components than those shown in FIG. 5 may be used.

Figure 6:
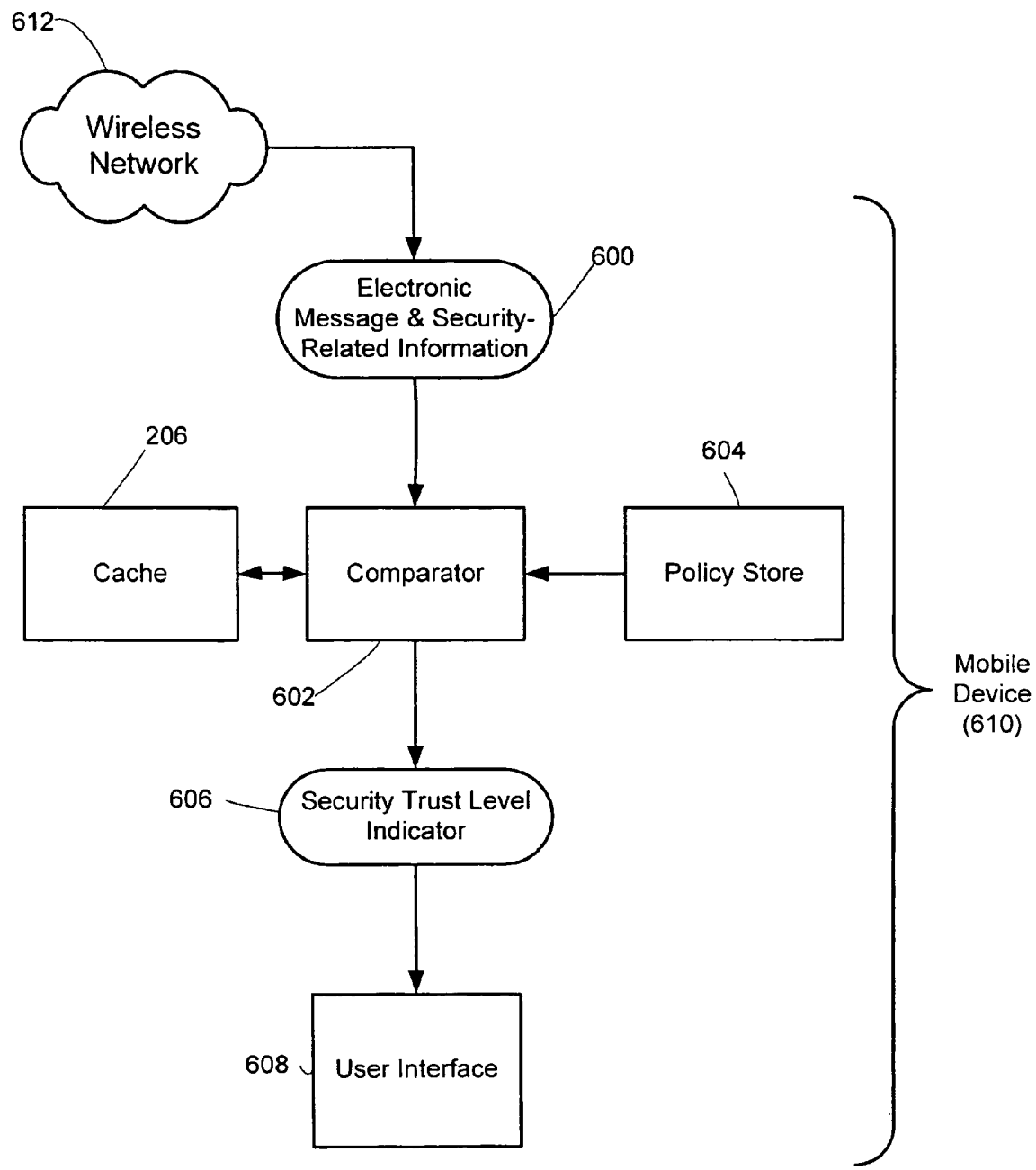
FIGS. 6-8 depict examples of indicting encryption strength.

As another example of the wide scope of the systems and methods disclosed herein and the many different types of message state data that can be generated and stored in cache 206, FIG. 6 illustrates the generation of security reliability (e.g., trust) level indicators on a mobile device 610. In the example of FIG. 6, an electronic message 600 (e.g., e-mail) is sent to the mobile device 610 by use of wireless network 612. Electronic message 600 may be secured by a variety of methods and transmitted along with associated security-related information such as a digital signature or certificate chain. It is possible for security-related information associated with electronic message 600 to be sent separately from the electronic message 600.

When the mobile device 610 receives an electronic e-mail message and its associated security-related information 600, the mobile device 610 proceeds to decrypt the message 600 and verify the identity of the sender using known techniques. The mobile device 610 determines the trust or reliability strength of the cipher used by referring to a policy store 604 on the mobile device 610. Policy store 604 contains relevant details of available ciphers and their respective security trust classifications. On the mobile device 610, a comparator module 602 can be invoked to perform a comparison between the message's security-related information and the information stored in the policy store 604. Based upon the comparison, a corresponding security trust level or category is determined for the message and stored in cache 206. As disclosed above, an indicator 606 of the corresponding security trust level is provided to the device's user interface 608.

As an example, if the cipher used to encrypt the message 600 is classified in the policy store 604 as a "weak" cipher, then the user is presented with an indication 606 that the cipher is classified as "weak." As different users or organizations may have different standards used to determine the security trust provided by ciphers, the policy store 604 allows an information technology (IT) administrator to store classifications for known ciphers based on relevant standards. These classifications can typically be referred to as cipher policies. For instance, the IT administrator for a government agency may prescribe more stringent tests for a cipher, while the IT administrator for a corporate agency may prescribe less stringent tests. This may lead to a cipher being classified as "weak" by the government agency, but as "strong" by the corporate agency. These cipher policies may be deployed "over the air" to the mobile device 610 through the wireless network 612, thereby allowing the mobile device 610 to always maintain an up-to-date set of cipher policies. Cipher polices deployed through the wireless network 612 by the IT administrator, may be used to update the policy store 604 of the device 610.

Figure 7:
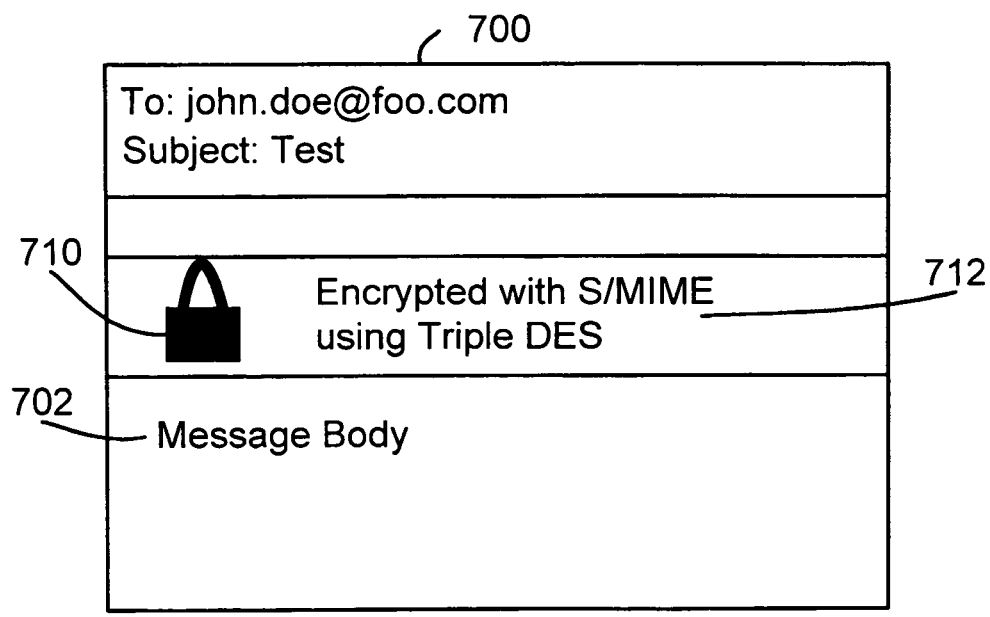

In this example, ciphers are classified as being either "weak" or "strong". Any number of alternate classifications may also be used as needed. FIG. 7 shows an example screen of the mobile device 610. In this case, the message 700 was encrypted using a "strong" cipher. A lock icon 710 indicates that the message 700 was encrypted, while an encryption indication message 712 indicates the secure messaging protocol (S/MIME) and the cipher (Triple-DES) were used. As an illustration, the encryption indication message 712 could be "Encrypted using S/MIME using Triple-DES cipher" or any other similar message. As shown in FIG. 7, message 712 can be configured to indicate to the user that a strong cipher was used.

Figure 8:
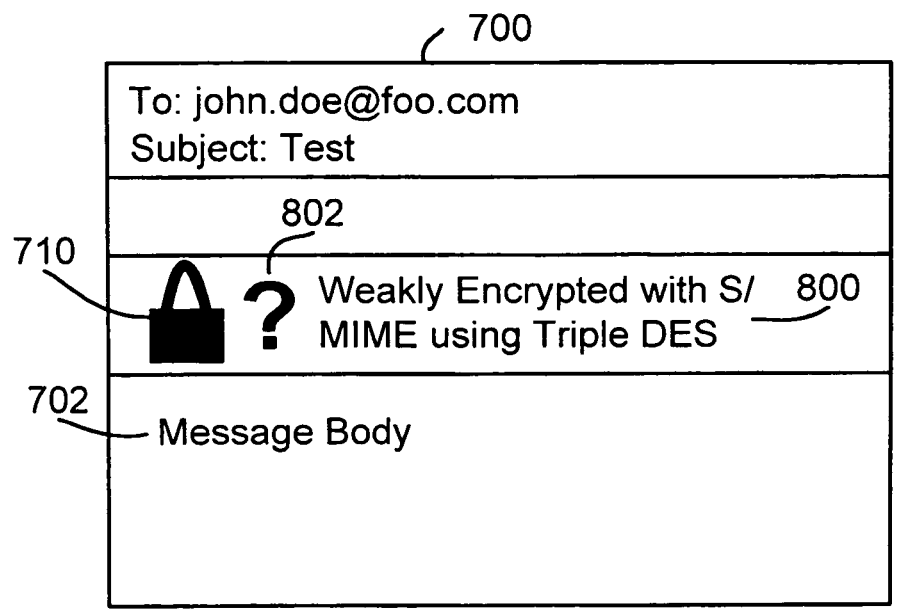

As another example, FIG. 8 shows a screen demonstrating a sample message 700 shown to the user in the case that the cipher used to encrypt the message 700 was classified as weak. In the example, the lock icon 710 indicates to the user, that the message 700 was an encrypted message, while the question mark 802 may indicate that a "weak" cipher was used. Additionally, the encryption indication message 800 could be "Weakly encrypted using S/MIME using Triple-DES cipher" or a similar message. In both example cases, the user may select the lock icon 710 to request details of the secure message protocol and the cipher used. Alternatively, the user may request additional details from a menu provided to the user. As a result, the user may know whether the message 700 was encrypted using a "strong" or a "weak" cipher or some other category of ciphers based on a cipher policy determined by their administrator.

It is claimed:

1. A method for handling an encoded message that was received by a wireless mobile communications device, wherein state data about the encoded message is generated based upon a first access of the encoded message, comprising the steps of:
storing the generated message state data in a cache of the wireless mobile communications device, wherein the generated message state data comprises information related to the encoding of the encoded message;
accessing from the cache the stored message state data based upon a second access of the encoded message;
generating a message indicator based upon the message state data that was accessed from the cache;
wherein the generated message indicator is provided to a user interface of the wireless mobile communications device;
wherein the generated message state data is stored in the cache after the first access of the encoded message,
wherein the generated message state data is stored for subsequent accesses of the encoded message;
determining whether the cache contains message state data about the received encoded message;
wherein if the message state cache does not contain information for the received encoded message, then displaying a temporary message indicator to the user interface of the wireless mobile communications device;
performing full processing on the received encoded message; and
providing an indicator to the user interface of the wireless mobile communications device based upon the fully processed encoded message.

2. The method of claim 1, wherein the generated message indicator includes an icon, text, graphic, or audio that is presented to the user interface of the wireless mobile communications device.

3. The method of claim 1, wherein the generated message indicator represents that the received encoded message was signed.

4. The method of claim 1, wherein the generated message indicator represents that the received encoded message was protected by an encryption mechanism.

5. The method of claim 1, wherein the generated message indicator represents trust status or revocation status of the encoded message's digital certificate.

6. The method of claim 1, wherein the generated message indicator represents validity status of a digital certificate that is attached to the encoded message.

7. The method of claim 1, wherein the generated message indicator represents whether sender of the encoded message asked that a signed receipt be sent when the encoded message is accessed by a recipient.

8. The method of claim 1, wherein before the first access of the encoded message the cache does not contain message state data related to the encoded message.

9. The method of claim 1, wherein the stored message state data includes validity of the digital signature associated with the encoded message.

10. The method of claim 1, wherein the stored message state data includes message sender information.

11. The method of claim 1, wherein the message state data includes information about a content cipher that was used to encrypt the encoded message.

12. The method of claim 1, wherein the generated message indicator is displayed, before any message encoding processing occurs with respect to the encoded message.

13. The method of claim 1, wherein decoded message body of the encoded message is also stored in cache for use in subsequent accesses involving the received encoded message.

14. The method of claim 1, further comprising the steps of:
determining that a message state change has occurred since the encoded message was last accessed and the message state data was cached;
providing an updated indicator to the user interface of the wireless mobile communications device that reflects the message state change.

15. The method of claim 14, wherein a change in the message state results from revocation of a digital certificate whose corresponding private key was used to sign the encoded message provided to the wireless mobile communications device.

16. The method of claim 14, wherein the message state change results from addition of a related digital certificate to a set of trusted certificates provided to the wireless mobile communications device.

17. The method of claim 1, wherein the cache is cleared of information about the encoded message based upon occurrence of a pre-selected event.

18. The method of claim 17, wherein the event includes the wireless mobile communications device entering into a locked mode or into a mode where the wireless mobile communications device is locked up and no activity can be performed or wherein a predetermined menu item is selected on the wireless mobile communications device.

19. The method of claim 1, wherein means for providing a wireless network and means for providing an electronic mail message server are used to communicate the encoded message to the wireless mobile communications device.

20. The method of claim 1, wherein the wireless mobile communications device is a handheld wireless mobile communications device.

21. The method of claim 1, wherein the first access of the encoded message is a user-initiated access of the encoded message.

22. The method of claim 1, wherein the first access of the encoded message results from the wireless mobile communications device accessing the encoded message upon receipt of the encoded message.

23. The method of claim 1, wherein the message was closed between the first and second accesses of the encoded message.

24. The method of claim 23, wherein pre-processing of the encoded message determines first message state data for storage in the cache;
    wherein the first message state data is retrieved from the cache in order to be displayed to the user interface of the wireless mobile communications device;
    wherein additional message processing occurs after the first message state data is stored in the cache;
    wherein the additional message processing includes decrypting the encoded message;
    wherein the additional message processing provides second message state data that is used to update the display of message state data.

25. The method of claim 1, wherein the generated message state data includes a security trust level for the encoded message.

26. The method of claim 1, wherein the encoded message is an encrypted e-mail message.

27. An apparatus for handling an encoded message that was received by a wireless mobile communications device, wherein state data about the encoded message is generated based upon a first opening of the encoded message, comprising:
    a message processor that stores the generated message state data in a cache of the wireless mobile communications device, wherein the generated message state data comprises information related to the encoding of the encoded message;
    an accessing module that, based upon a second opening of the encoded message, retrieves from the cache the stored message state data;
    wherein a message indicator is generated based upon the message state data that is accessed from the cache;
    wherein the generated message indicator is provided to a user interface of the wireless mobile communications device;
    wherein the generated message state data is stored in the cache after the first access of the encoded message,
    wherein the generated message state data is stored for subsequent accesses of the encoded message;
    a determination module that determines whether the cache contains message state data about the received encoded message;
    wherein if the message state cache does not contain information for the received encoded message, then a temporary message indicator is displayed to the user interface of the wireless mobile communications device;
    a processing module that performs full processing on the received encoded message; and
    an indication module that provides an indicator to the user interface of the wireless mobile communications device based upon the fully processed encoded message.

28. A wireless mobile communications device that handles an encoded message comprising:
    means for receiving the encoded message over a wireless network;
    means for generating state data about the encoded message;
    means for storing the message state data in a cache, wherein the generated message state data comprises information related to the encoding of the encoded message;
    means for accessing from the cache the message state data when content of the received encoded message is to be retrieved;
    wherein the message state data that was stored in the cache due to a first accessing of the encoded message is available for retrieval from the cache for a second accessing of the encoded message; and
    means for generating a message indicator based upon the message state data that was accessed from the cache;
    wherein the generated message indicator is provided to a user interface of the wireless mobile communications device;
    means for determining whether the cache contains message state data about the received encoded message;
    wherein if the message state cache does not contain information for the received encoded message, then a temporary message indicator is displayed to the user interface of the wireless mobile communications device;
    means for performing full processing on the received encoded message; and
    means for providing an indicator to the user interface of the wireless mobile communications device based upon the fully processed encoded message.

29. The wireless mobile communications device of claim 28, wherein the message state data that was stored in the cache due to the first accessing of the encoded message is available for retrieval from the cache for a third accessing of the encoded message.

30. A tangible computer-readable storage medium encoded with instructions that cause a mobile device to perform a method for handling an encoded message that was received by the mobile device, wherein state data about the encoded message is generated based upon a first access of the encoded message, said method comprising the steps of:
    storing the generated message state data in a cache of the wireless mobile communications device, wherein the generated message state data comprises information related to the encoding of the encoded message;
    accessing from the cache the stored message state data based upon a second access of the encoded message;
    generating a message indicator based upon the message state data that was accessed from the cache;
    wherein the generated message indicator is provided to a user interface of the wireless mobile communications device;
    wherein the generated message state data is stored in the cache after the first access of the encoded message,
    wherein the generated message state data is stored for subsequent accesses of the encoded message;
    determining whether the cache contains message state data about the received encoded message;

wherein if the message state cache does not contain information for the received encoded message, then displaying a temporary message indicator to the user interface of the wireless mobile communications device;

performing full processing on the received encoded message; and providing an indicator to the user interface of the wireless mobile communications device based upon the fully processed encoded message.

* * * * *